Jan. 5, 1937.  W. B. BARNES  2,066,873
OVER-DRIVE TRANSMISSION
Filed June 24, 1933  2 Sheets-Sheet 1

INVENTOR.
William B. Barnes,
BY
Hood & Hahn
ATTORNEYS

Jan. 5, 1937.  W. B. BARNES  2,066,873
OVER-DRIVE TRANSMISSION
Filed June 24, 1933  2 Sheets-Sheet 2
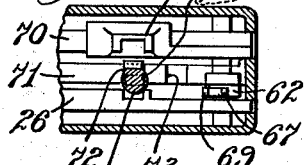
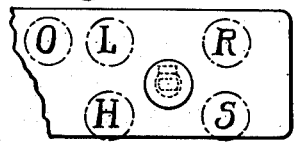
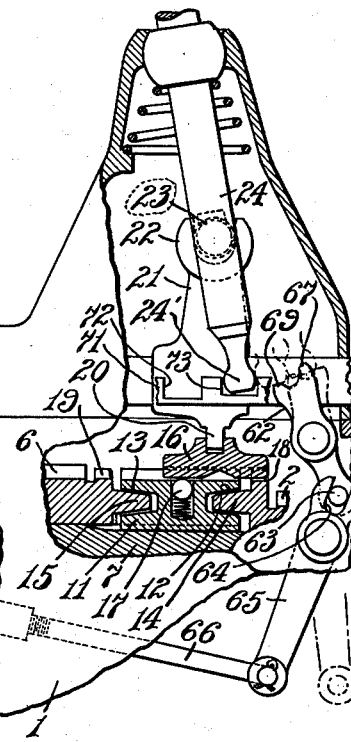
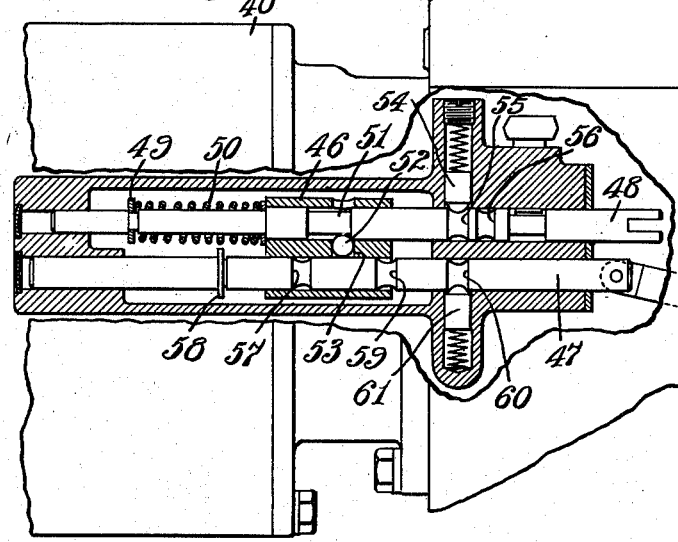
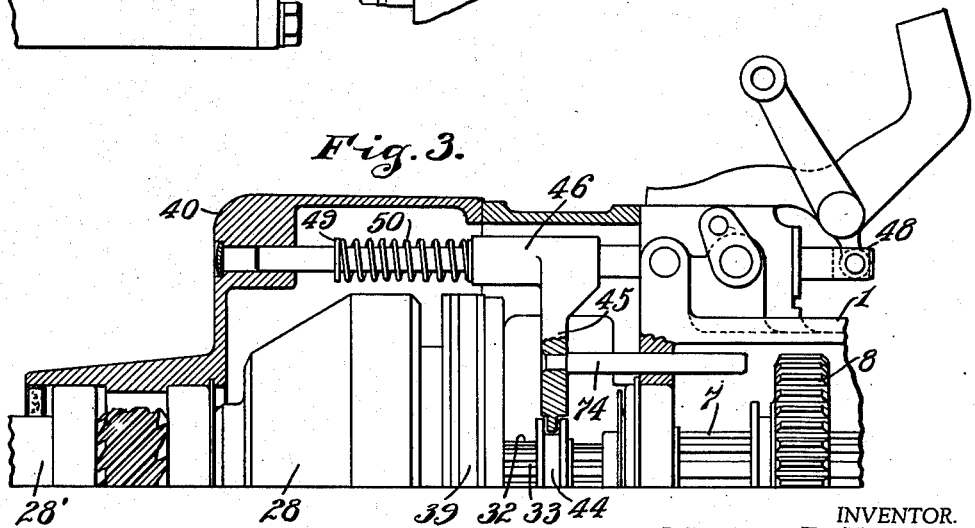
INVENTOR.
William B. Barnes,
BY
Hood & Hahn.
ATTORNEYS Patented Jan. 5, 1937

2,066,873

UNITED STATES PATENT OFFICE 2,066,873

OVER-DRIVE TRANSMISSION

William B. Barnes, Indianapolis, Ind.

Application June 24, 1933, Serial No. 677,410

8 Claims. (Cl. 74—328)

My invention relates to improvements in automobile transmissions and the control thereof.

My invention relates more particularly to that type of automobile transmission wherein there is provided an overdrive mechanism for operating the propeller shaft at a higher rate of speed than is normally provided by the ordinary three speed transmission.

My invention is also applicable for use in connection not only with a transmission for an overdrive, but is applicable to a transmission structure wherein there is not only an overdrive but a "free wheeling" drive which permits the driven shaft of the vehicle to be disconnected from the drive or propeller shaft when the vehicle operates at a higher speed than that of the engine or propeller shaft.

One of the objects of my invention is to provide a control mechanism for the overdrive gearing which may be operated by the shift lever for the transmission and which is so arranged that a shift into overdrive cannot be accomplished except from "high" speed drive.

Another object of my invention is to provide means whereby the control mechanism for the free wheeling mechanism may be shifted into a position to automatically shift the drive into free wheeling or lockup position, whichever is selected whenever a shift is made from overdrive to direct drive.

Another object of my invention is to provide a control mechanism for the overdrive gearing which may control the overdrive mechanism by the shifting of the shift lever to a position to the rear of low speed drive position, the arrangement being such that the normal shifting position of the shift lever as is almost universally adopted now for three speed forward and one reverse drive, is undisturbed.

For the purpose of disclosing my invention I have illustrated one embodiment in the accompanying drawings in which Fig. 1 is a longitudinal section of a transmission embodying my invention;

Fig. 2 is a side elevation partly in section, of the control mechanism;

Fig. 3 is a detail sectional view showing the manner in which the free wheeling clutch is locked out in shifting into reverse drive;

Fig. 4 is a plan view partly in section, of the shift rod mechanism and control therefor, and Fig. 5 is a schematic drawing showing the various positions of the top of the shift lever for controlling the various drives.

Figure 1:
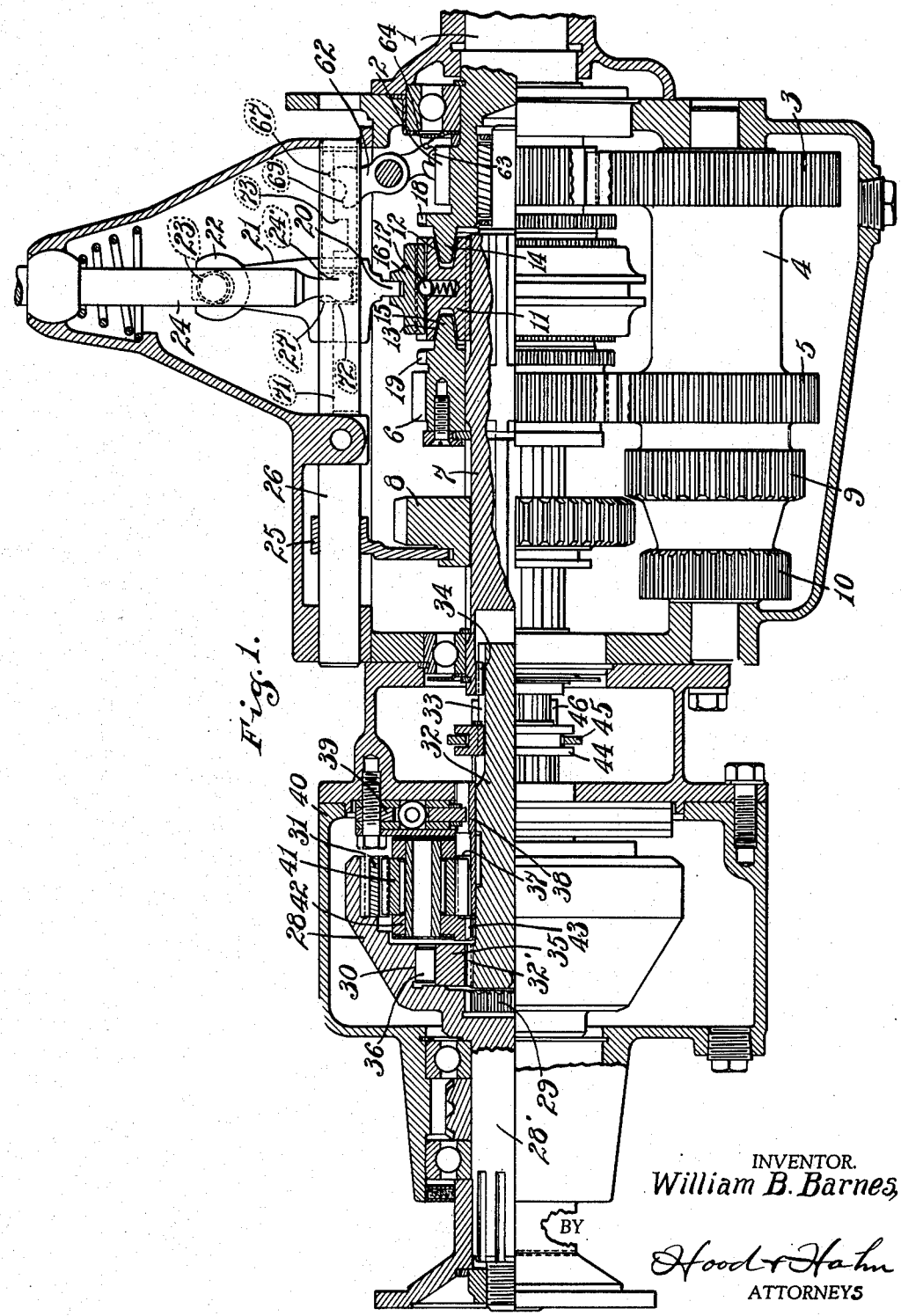

In the embodiment of the invention illustrated a transmission having the usual three speeds forward and one reverse is provided. In the specific type of transmission illustrated I provide a drive shaft 1 which may be connected with the engine through the instrumentality of the usual friction clutch. This drive shaft has formed thereon a driving gear 2 which in turn meshes with a gear 3 on a countershaft spindle 4. The countershaft spindle 4 is provided with a gear 5 meshing with a gear 6 normally rotatably mounted on a driven shaft 7. The drive through the gears 2, 3, 5 and 6, when the gear 6 is drivingly connected with the shaft 7, constitutes the second speed drive of the transmission. The low speed drive is through the medium of a gear 8 splined on the shaft 7 and adapted to mesh with a gear 9 on the spindle 4. Reverse drive occurs when the gear 8 meshes with an idler (not shown), normally meshing with a gear 10 on the spindle 4.

The shaft 7 is adapted to be connected with the gear 6 or directly with the shaft 1 through the instrumentality of a synchronizing clutch mechanism. This mechanism is of such character that before a positive clutch engagement is made a friction clutch is operated to bring the two parts into synchronism. In general, this clutch comprises a friction clutch member 11 splined on the shaft 7 and having the two cone clutch surfaces 12 and 13 adapted to respectively engage cone clutch members 14 on the shaft 1 and 15 on the gear 6. This member 11 is operated through the instrumentality of a sleeve 16 resiliently connected through the ball poppets 17 with the friction clutch member 11 and this sleeve is provided with positive clutch teeth adapted to selectively engage either the teeth 18 on the shaft 1 or the teeth 19 on the gear 6. This member 16 is operated through the medium of the usual shift fork 20 mounted on a shift rod having an upward extension 21 provided with a fork 22 adapted for engagement with a projection 23 on the shift lever 24. The gear 8 is operated by a shift fork 25 on a shift rod 26 having a recess 27 in the side thereof for engagement by the lower end 24' of the shift lever.

The overspeed drive and free wheeling drive is accomplished through a gear mechanism arranged at the rear end of the transmission heretofore described. To this end the propeller shaft 28' of the vehicle is provided with an overhanging hub member 28 having a series of internal clutch teeth 29 formed therein and having a friction surface 30 constituting one of the friction surfaces of an overrunning clutch. In addition to the above, this member 28 is provided at its front end with a ring gear 31. An axially movable intermediate shaft 32 is interposed between the shaft 7 and the propeller shaft 28', being provided with splines 33 for engagement with teeth 34 on the shaft 7 so that the two shafts are rotatably connected while the shaft 32 is axially movable relatively to the shaft 7.

This shaft 32 at its rear end is provided with splined teeth 32' adapted to mesh, for direct drive, or in lockup position, with the teeth 29 and also adapted to mesh with teeth formed on the inner portion of an inner member 35 of an overrunning clutch. This inner member is preferably provided with cam surfaces and interposed between these cam surfaces and the surface 30 are overrunning clutch rollers 36.

A sun gear 37 mounted on a sleeve 38 stationarily connected through suitable connecting means 39 with one wall of the casing 40 is mounted to cooperate with a series of pinions 41 meshing with the sun gear and the ring gear and carried by a pinion carrier 42. This pinion carrier is provided with internal teeth 43 also adapted to be engaged, by a suitable shifting of the shaft 32, by the teeth 32'.

The arrangement is such that when the shaft 32 is shifted to the left, looking at Fig. 1, to engage the teeth 32' with the teeth 29, a direct lockup drive will be established between the shaft 7 and the propeller shaft 28'.

If, however, the shaft 32 is allowed to remain in the position illustrated in Fig. 1, a direct drive will be established between the shaft 7 and the shaft 32 through the overrunning clutch with the shaft 28'. That is, a free wheeling drive will be established. If shaft 32 is shifted further to the right, looking at Fig. 1, until the teeth 32' engage the teeth 43 of the pinion ring a drive from the shaft 7 to the shaft 28' will be established through the overspeed planetary gearing. It will be noted, however, that when the overspeed drive takes place, in this particular construction, free wheeling cannot be established. Free wheeling can only be established in what may be termed the direct drive and will only occur when the drive is either in low, second or high speeds of the transmission.

The intermediate shaft 32 is provided with a grooved collar 44 adapted to receive a shift fork 45, the hub 46 of which is carried upon a pair of shift rails 47 and 48. The shift rail 48 may be termed the free wheeling and lockout shift rail while the shift rail 47 may be termed the overspeed drive shift rail. The rail 48 is provided with a stationary collar 49 interposed between which and the hub 46 is a coiled spring 50 adapted to normally bias the hub 46 into a free wheeling, non-overdrive position, or the position illustrated in Fig. 2. This rail 48 is provided with an annular groove 51 adapted to receive, under certain conditions, a ball 52 located in a recess 53 in the hub 46. The purpose of this groove and ball will appear more fully hereinafter. The rail is maintained in its respective shifted position by means of a spring retainer 54 adapted to take into annular grooves 55 and 56 in the rail.

This shift rail 48 is adapted to be connected with any suitable operator-manipulating means, such for instance as a Bowden wire which preferably extends up to a position on the instrument board of the vehicle.

The shift rail 47 is provided with a receiving annular groove 57 for the ball 52 and with a stationary collar 58 adapted under certain conditions to engage and move the hub 46. In addition to the annular grooves 57, this rail is provided with a positioning groove 59 and a second positioning groove 60 adapted respectively to receive the positioning poppet 61.

This rail is operated through the instrumentality of the shift lever 24 and to this end there is provided a pivotally mounted rocking lever 62 the lower end of which is connected by a pin 63 in a slot 64 with a second pivoted lever 65 connected by the link 66 with the shift rail 47. This rocking lever 62, at its upper end, is provided with a forked extension one prong 67 of which extends above the other prong and in the path of the lower end 24' of the shift lever 24, when the shift lever is moved to a certain predetermined position, as will be more fully explained hereinafter.

The arrangement of the projection or prong 67 is such that when the lever 24 is shifted for the purpose of shifting the rocking lever 62 this projection will first be engaged by the side of the lower end 24' of the shift lever. However, after the shift lever has moved to the limit of its movement the bottom of the lower end 24' will rest on top of the prong or projection 67 so that with the shift lever moved to the limit of its stroke, the rocking arm 62 will be locked in its shifted position. However, as the lower end 24' of the shift lever is moved in the reverse direction the bottom of the arm will move off of the top of the fork 67 and will engage the fork 69 for the purpose of rocking the lever 62 in a reverse direction. After this rocking movement has been accomplished this fork 69 will have been shifted to a position to permit a continued shift of the shift lever to the left looking at Fig. 2, without affecting the rocking lever 62.

As has heretofore been explained, the shift rail 26 controls the movement of the gear 8 for reverse and low speed shift. The shift rail 70, having mounted thereon the fork 22, controls the movement of the clutch mechanism for second and high speed drive. By reference to Fig. 4 it will be seen that the upper end of the rocking arm 62 lies adjacent to the shift rail 26 and in a cutout portion thereof. For the purpose of guiding the lower end of the shift lever 24 an intermediate guide plate 71 is provided, which plate is notched as at 72 to permit a shifting of the lower end of the lever to right or left for engagement with the rails 26 and 70. This plate also guides the lower end of the shift lever, particularly during its shifting movement into "high" so that the rocking arm 62 will not be engaged until after the lever has completed its movement for shift into high. To permit a shift of the lower end of the lever to the right into a position to engage the rocking arm 62 after a shift into high, the guiding plate 71 is provided with a further notch 73 so that the lower end of the shift lever 24 may be shifted to the left, and into a position to engage the top end of the rocking lever 62, by a continued forward movement of the shift lever.

The various positions of the top end of the shift lever are indicated diagrammatically in Fig. 5. As shown in Fig. 5, the position L of the upper end of the lever is for low speed drive; the position S is for second speed drive and the position H is for high speed drive, while the position O, which it will be noted is directly behind the position L, is for overspeed drive and this position, as heretofore explained, can only be taken after the lever has been shifted for high speed drive. The position R is for reverse drive. It is therefore apparent that the shifting of the lever for the ordinary three speeds forward and one reverse is the standard shift and that the overspeed drive shift occurs only from high speed to overdrive.

In operation, in controlling the overdrive, the lockout and the free wheeling drive we will assume that the parts are in the position illustrated in Figs. 1 and 2 which is direct drive with free wheeling. If the rocking lever 62 is rocked forward, in the manner heretofore described, this will in turn, through the arm 65 and link 66, move the shift rail 47 to the right, looking at Fig. 2. During the initial movement of this shift rail the groove 57 will be moved to a position to receive the ball 52, thereby dropping the ball out of its socket 53. At about this point the collar 58 will engage the hub 46, moving the same to the right, thereby shifting the shaft 32 (referring to Fig. 1), to the right, engaging the teeth 32' with the teeth 43 and thereby establishing the overspeed drive through the planetary gear drive. If the operator desires to drive through the free wheeling drive, when he goes back to "direct drive", the shift rail 48 is left in the position to which it has been moved. If, however, the operator desires to drive in lockout drive, when he shifts from overdrive to direct drive he will manipulate the shift rail 48, moving the same to the left, until the poppet stop 54 engages in the positioning notch 56. Bearing in mind now that the ball 52 is in the groove 57, this movement of the rod 48 to the left will in no wise affect the position of the hub 46, but will move the notch 51 further to the left so that the shift rail 48 will maintain the ball locked in the notch 57. If now, the operator manipulates the shift lever 24 to move the rocking arm 62 to the left, this will move the shift rail 47 to the left and with the ball 52 locked in the groove 57 the hub 46 will be moved with the shift rail 47, thereby shifting the intermediate shaft 32, looking at Fig. 1, to the left and engaging the teeth 32' with the teeth 29, thereby locking the overrunning clutch. When this occurs the ball 52 again becomes opposite the groove 51, when it will move out of the groove 57 and into a neutral position, thereby releasing the shift rail 47 and permitting it to continue in its reverse or movement to the left without further affecting the movement of the shift rail 48. However, if now it is desired to shift into free wheeling position the operator can again move the shift rail 48 forward which, through the instrumentality of the spring 50 will move the hub 46 forward or to the right, looking at Fig. 2, and with it the intermediate shaft 32 until the teeth 32' are moved out of engagement with the teeth 29. It is therefore apparent from the above that the operator may at any time, while in direct drive, shift into free wheeling or lockup position, as desired. It is further apparent that when in overdrive position the operator may optionally shift the control to free wheeling or lockup position and that when he shifts out of overdrive and into direct drive the parts will be moved automatically into the position selected for either free wheeling or lockup position.

In order that the free wheeling may be locked up or locked out whenever a shift is made into reverse drive, the shifting fork 45 is provided with a projecting pin 74 which is in the path of movement of the gear 8. Therefore, when the gear 8 is shifted to the left, looking at Fig. 3, or into reverse drive position, this pin 74 will be struck by the gear and the hub 46 will be moved to the left, thereby moving the shaft 32 into a direction to engage teeth 32' and 29 and lock out the free wheeling clutch. At the same time the spring 50 is placed under compression so that when the gear 8 is shifted back into forward drive position the hub 46 will move to restore the parts to free wheeling, if the parts have been initially set for free wheeling.

I claim as my invention:

1. The combination with a transmission having low, second, high, and reverse gearing drive, and an overspeed drive, of a shift lever, means operated by said shift lever for shifting said gearing to effect said low, second, high, and reverse drive, and means positioned to be engaged by said lever when moved to a position to the rear of low speed drive position of said lever for operating said gearing to effect an overspeed drive.

2. The combination with a transmission having low, second, high, and reverse gearing drive and an overspeed gearing drive, of a shift lever, means operated by said lever for shifting said gearing to effect said low, second, high, and reverse gear drive, a rocking arm positioned to be engaged by a shift of said lever to the left from high speed position and locking by a movement of said lever to the rear from high speed position to shift said overspeed gearing to effect an overspeed drive.

3. The combination with a transmission having low, second, high, and reverse gearing drive and an overspeed gearing drive, of a pair of shift forks arranged side by side, a shift lever movable transversely from an intermediate position to selectively engage either of said shift forks and movable longitudinally to shift either of said forks, means interposed between the axes of said forks adapted to be engaged by a transverse movement of said shift lever when the same is moved out of engagement with one of said shift forks after having shifted the same and moved by a continued movement of the shift lever in the same shifting direction to operate said overspeed gearing to effect an overspeed drive.

4. The combination with a transmission for low, second, high, and reverse gearing drive and an overspeed gearing drive, of a pair of shift rails, shifting forks mounted on said shifting rails and axially movable to shift said second, high, low, and reverse gearing, a shift lever transversely shiftable into engagement with either of said forks, an operating member interposed between said shift rails and engaged by said shift lever when the same is moved transversely out of engagement with one of said shift forks and operated by a continued movement of said shift lever in the same direction in which it has operated said shift fork to operate said overspeed gearing to effect an overspeed drive.

5. The combination with a transmission having low, second, high, and reverse gearing drive and having an overspeed drive, of a shift fork for controlling said overspeed drive, a shift rail on which said shift fork is mounted, a shifting lever associated with means for shifting said low, second, high, and reverse gearing, an operating arm extending into the path of said shift lever and connected with said shift rail and engaged by said shift lever by a continued movement of the same in the high speed direction shift to render said overspeed drive effective.

6. In a transmission including an overspeed drive, a one-way drive and a two-way drive, a shift fork for selectively effecting the overspeed drive, the one-way drive, or the two-way drive, means for operating said shift fork to selectively effect the one-way drive and the two-way drive, and a second means for operating said shift fork to effect said overspeed drive.

7. The combination with a transmission including an overspeed drive, a one-way drive and a two-way drive, a shift fork for controlling said transmission to effect said one-way drive, said two-way drive, and said overspeed drive, a manually operated shifting member for operating said shift fork to selectively effect the one-way drive or the two-way drive, a second manually operated member for operating said shift fork to effect said overspeed drive, said first-mentioned manually operated means being movable independently of said shift fork when the same has been shifted to effect an overspeed drive and to a position to selectively cause said shift fork to effect a one-way drive or a two-way drive when the same is shifted by said second-mentioned manually operated means out of the overspeed drive position.

8. The combination with a transmission having an overspeed drive, a one-way drive and a two-way drive, of a shift fork for operating said transmission to selectively effect any of said drives, manually operated means for shifting said fork for effecting either said one-way or two-way drives, a second manually operated means for shifting said fork to effect said overspeed drive, means for disconnecting said fork from said first-mentioned manually operated means when the fork is shifted by said second-mentioned manually operated means into its overspeed drive position, and means for shifting said first-mentioned manually operated means to maintain said connecting means in operative position during the shifting of said fork out of overspeed drive position and until either said one-way drive or two-way drive position has been reached.

WILLIAM B. BARNES.